(12) United States Patent
Richter

(10) Patent No.: US 8,944,483 B2
(45) Date of Patent: Feb. 3, 2015

(54) ADJUSTABLE MODULAR SHELVING SYSTEM

(71) Applicant: Adrian Steel Company, Adrian, MI (US)

(72) Inventor: Thomas S. Richter, Sand Creek, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 13/898,707

(22) Filed: May 21, 2013

(65) Prior Publication Data

US 2013/0307285 A1 Nov. 21, 2013

Related U.S. Application Data

(60) Provisional application No. 61/649,791, filed on May 21, 2012.

(51) Int. Cl.
| | |
|---|---|
| *B60R 7/08* | (2006.01) |
| *B60P 1/64* | (2006.01) |
| *A47B 96/02* | (2006.01) |
| *A47B 47/02* | (2006.01) |
| *A47B 57/20* | (2006.01) |

(52) U.S. Cl.
CPC . *B60P 1/64* (2013.01); *A47B 96/02* (2013.01); *A47B 47/025* (2013.01); *A47B 57/20* (2013.01)
USPC ........................................ 296/24.44; 296/37.1

(58) Field of Classification Search
CPC ............ B60R 7/02; B60R 7/08; B60R 11/00; B62D 33/044
USPC ..................... 296/3, 24.44, 24.45, 37.1, 37.6; 224/402–405, 540
See application file for complete search history.

(56) References Cited

U.S. PATENT DOCUMENTS

| | | | | |
|---|---|---|---|---|
| 3,727,813 A | * | 4/1973 | Eby ................................ | 224/540 |
| 5,306,064 A | * | 4/1994 | Padovano et al. .......... | 296/24.44 |
| 5,848,711 A | * | 12/1998 | Schmit ........................ | 211/90.04 |
| 6,270,138 B1 | * | 8/2001 | Laskowski et al. ........ | 296/24.44 |
| 6,386,610 B1 | * | 5/2002 | Butzke ........................ | 296/24.45 |
| 6,820,758 B2 | * | 11/2004 | May et al. .................... | 211/192 |
| 7,219,952 B2 | * | 5/2007 | Taylor ........................ | 296/182.1 |
| 7,641,253 B2 | * | 1/2010 | Steiger et al. ................ | 296/24.4 |
| 7,784,885 B2 | * | 8/2010 | Steiger et al. ................ | 312/107 |
| 8,117,972 B2 | * | 2/2012 | Winget et al. ................ | 108/108 |
| 8,157,312 B2 | * | 4/2012 | Bliss et al. .................. | 296/37.6 |
| 8,408,638 B2 | * | 4/2013 | Pencak et al. ................ | 296/191 |
| 8,414,046 B2 | * | 4/2013 | Pencak et al. ................ | 296/24.3 |

(Continued)

*Primary Examiner* — Gregory Blankenship
(74) *Attorney, Agent, or Firm* — Bill C. Panagos; Linda D. Kennedy; Butzel Long, PC

(57) ABSTRACT

An adjustable modular shelving system is secureable to a rail mounting system in the cargo area of a vehicle. The shelving system includes a pair of end panels, each pair having an end panel flange with a plurality of end panel flange apertures. The end panel flange extends along a portion of an outer periphery of each of the pair of end panels. The shelving system may include a shelf having a base and a pair of shelf flanges which extend from longitudinal end portions of the base, one of the pair of shelf flanges includes a plurality of locking mechanisms and another one of the pair of shelf flanges include a plurality of shelf apertures. The locking mechanisms may securably connect with a first side of the pair of end panels, and the plurality of shelf apertures may securably connect with a second side of the pair of end panels.

10 Claims, 10 Drawing Sheets

(56) References Cited

U.S. PATENT DOCUMENTS

2005/0225108 A1* 10/2005 Panasewicz et al. ....... 296/24.44
2007/0069542 A1* 3/2007 Steiger et al. .............. 296/24.44
2008/0012375 A1* 1/2008 Steiger et al. ................ 296/37.6
2011/0260488 A1* 10/2011 Bliss et al. ................... 296/37.7
2013/0307285 A1* 11/2013 Richter ...................... 296/24.44

* cited by examiner

ADJUSTABLE MODULAR SHELVING SYSTEM

CROSS-REFERENCE TO RELATED APPLICATIONS

This application claims priority to U.S. provisional patent application 61/649,791, filed May 21, 2012, which is incorporated by reference in its entirety.

TECHNICAL FIELD

The present disclosure relates generally to an adjustable modular shelving system. It may be used for many purposes, including with a rail mounting system included in a vehicle.

BACKGROUND

Various service professionals (e.g., electricians, plumbers, telephone/cable technicians, etc.) usually maintain within the cargo area of a commercial vehicle a substantial number of different items (e.g., tools, equipment, etc.) which are required for their respective tasks. Further, the aforementioned items may vary substantially in size and shape.

To provide such service professionals with a means for storing and organizing these items, various shelving systems are employed. Shelving systems that are used within a commercial vehicle are known in the art. However, there may be challenges associated with conventional shelving systems.

Some conventional shelving systems are not adjustable. With such systems, there exists an inflexibility in adjusting or adding shelves or other storage-related accessories. This is because in such systems, the shelves are permanently secured and thereby non-movable. In such an instance, the service professional would be unable to secure and transport a tool or piece of equipment if due to its size it was unable to be accommodated within such a known conventional shelving system. Accordingly, these types of conventional shelves cannot be modified to accommodate variously sized tools or equipment.

Thus, there is a need in the art for an adjustable modular shelving system for use with a rail mounting system included in a commercial vehicle which allows for the quick and easy installation of basic shelving units and/or more complex combinations of accessories for storing and transporting various products and inventory that vary in size and shape.

SUMMARY

The present disclosure describes exemplary adjustable modular shelving systems. These systems may be used within or on a commercial vehicle. The adjustable modular shelving system may be secured to a rail mounting system within the cargo area of a vehicle. The adjustable modular shelving system includes a pair of end panels, each of the pair of end panels include an end panel flange having a plurality of end panel flange apertures and extending along a portion of an outer periphery of said each of the pair of end panels.

The adjustable modular shelving unit additionally includes a shelving unit having a base and a pair of shelving unit flanges extending from respective longitudinal end portions of the base, one of the pair of shelving unit flanges including a plurality of locking locating pins and another one of the pair of shelving unit flanges including a plurality of shelving unit apertures. Further, the locking locating pins may securably connect with a first side of the pair of end panels via the end panel flange and the plurality of shelving unit apertures securably connect with a second side of the pair of end panels via the end panel flange using a securement feature.

A potential advantage of the present disclosure is that an adjustable modular shelving system is provided that may be installed in an expedient and easy manner. Another potential advantage of the adjustable modular shelving system is that it may allow for the inclusion of a varied combination of accessories. Another potential advantage of the present disclosure is that basic shelving units, other accessories, or a more complex combination of the aforementioned accessories may be included in the adjustable modular shelving system of the present application. Another potential advantage of the present disclosure is that various products and inventory of varying sizes may be stored and transported via the adjustable modular shelving system.

Other features and advantages of the present disclosure will become readily appreciated based upon the following description when considered in conjunction with the accompanying drawings.

DETAILED DESCRIPTION

Figure 1:
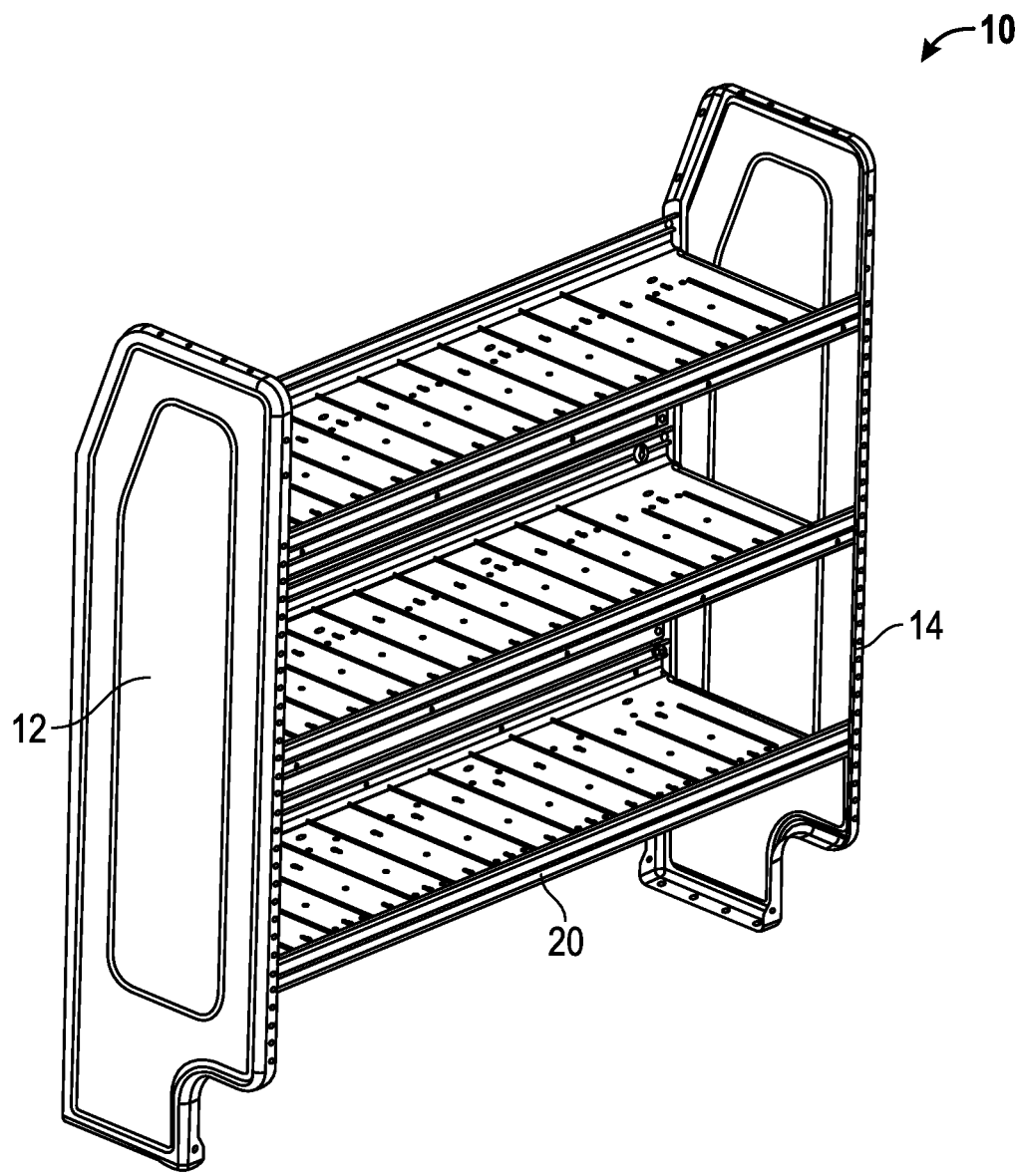
FIG. 1 is a perspective view of an adjustable modular shelving system.

Referring to the following description and drawings, exemplary approaches to the disclosed systems are detailed. Although the drawings represent some possible approaches, the drawings are not necessarily to scale and certain features may be exaggerated, removed, or partially sectioned to better illustrate and explain the disclosed devices. Further, the description below is not intended to be exhaustive, nor is it to limit the claims to the precise forms and configurations described and/or shown in the drawings Referring to FIG. 1, an exemplary adjustable modular shelving system 10 for use within the cargo area of a vehicle is illustrated. The adjustable modular shelving system 10 of this example includes a formed end panel 12 and shelf 20 having a predetermined arrangement. It should be appreciated that additional panels 12 and shelving units 20 may be included in the adjustable modular shelving system 10 beyond those illustrated in FIG. 1.

Referring to FIG. 1, an end panel 12 is illustrated. The end panel 12 is generally a planar member having an inner surface, outer surface and peripheral edge. An end panel flange 14 extends along the peripheral edge toward an opposing panel 12. Further, the end panel 12 is designed to securably couple via the end panel flange 14 with a rail mounting system which is securably mounted to one or more surfaces of a cargo area within a vehicle. However, it should be appreciated that in another example, the end panels 12 may be secured directly to a respective cargo area surface of the vehicle.

The shelving unit may include various accessory parts. These parts may be securely coupled to the end panel flange 14. For example, a shelf may be a generally planar member, used for the storage and transportation of various products and inventory in a vehicle. Further, these accessory parts, which are used to complete the adjustable modular shelving system 10, may include items such as the illustrated shelves 20 or more complex combinations of accessories (not illustrated), which may additionally include these shelves 20 combined therewith.

Figure 2:
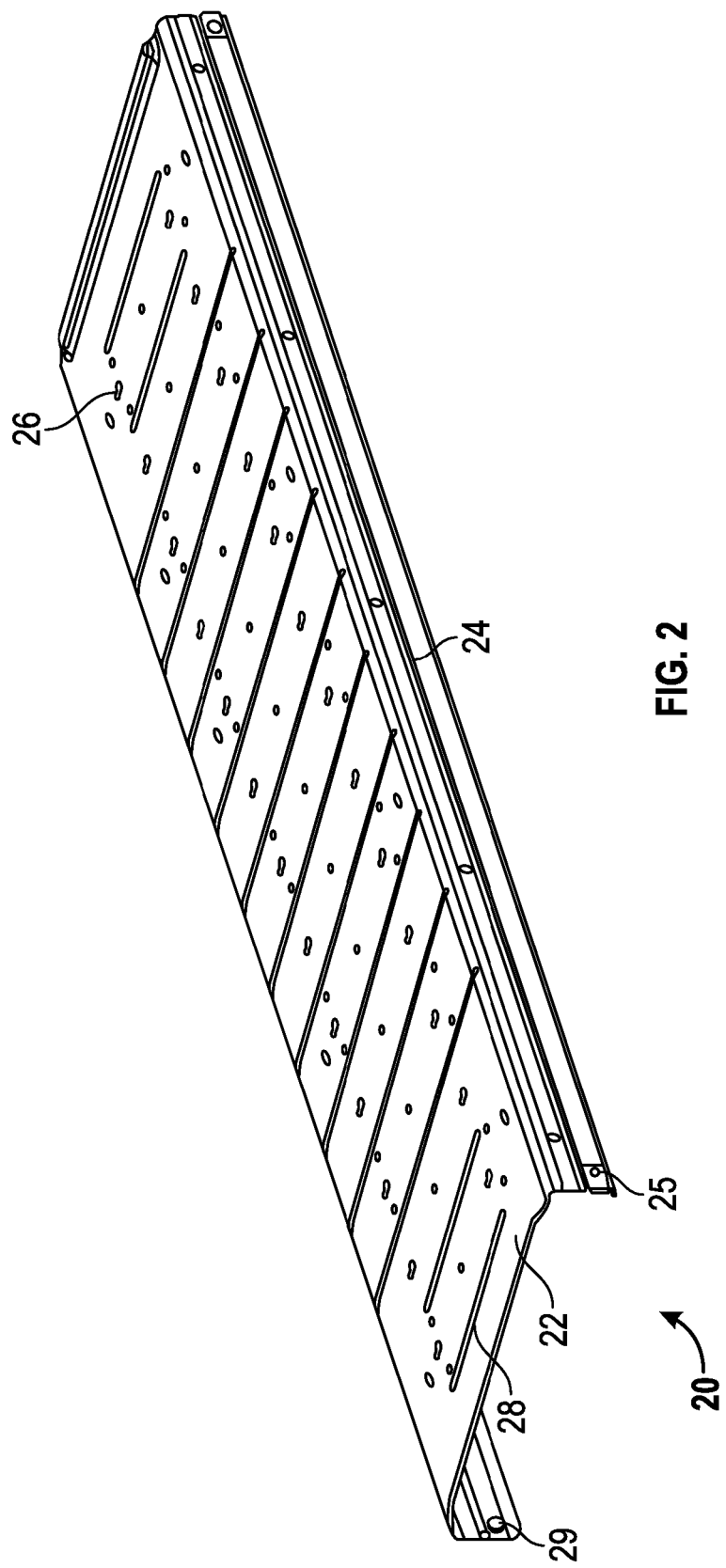
FIG. 2 is a perspective view of a shelving unit for the adjustable modular shelving system of FIG. 1.

Referring to FIG. 2, a shelf 20 may be securably coupled to formed end panels 12 of an adjustable modular shelving system 10 as illustrated. The shelf unit 20 includes a generally planar base 22, and flanges 24 extend perpendicular to a respective longitudinal edge of the shelf base 22.

One of the shelf flanges 24 may include an aperture 25 located near an outer peripheral portion of the shelf flange 24. The shelf flange aperture 25 may be used for establishing a securable coupling with the formed end panels 12. Although in this example a single aperture 25 is located at a location near each respective end of the shelf flange 24, it should be appreciated that additional apertures and at differing locations may be included in other embodiments. Further, another securing feature may be employed which provides a locking function between the shelving unit 20 and the end panels 12.

Figure 5:
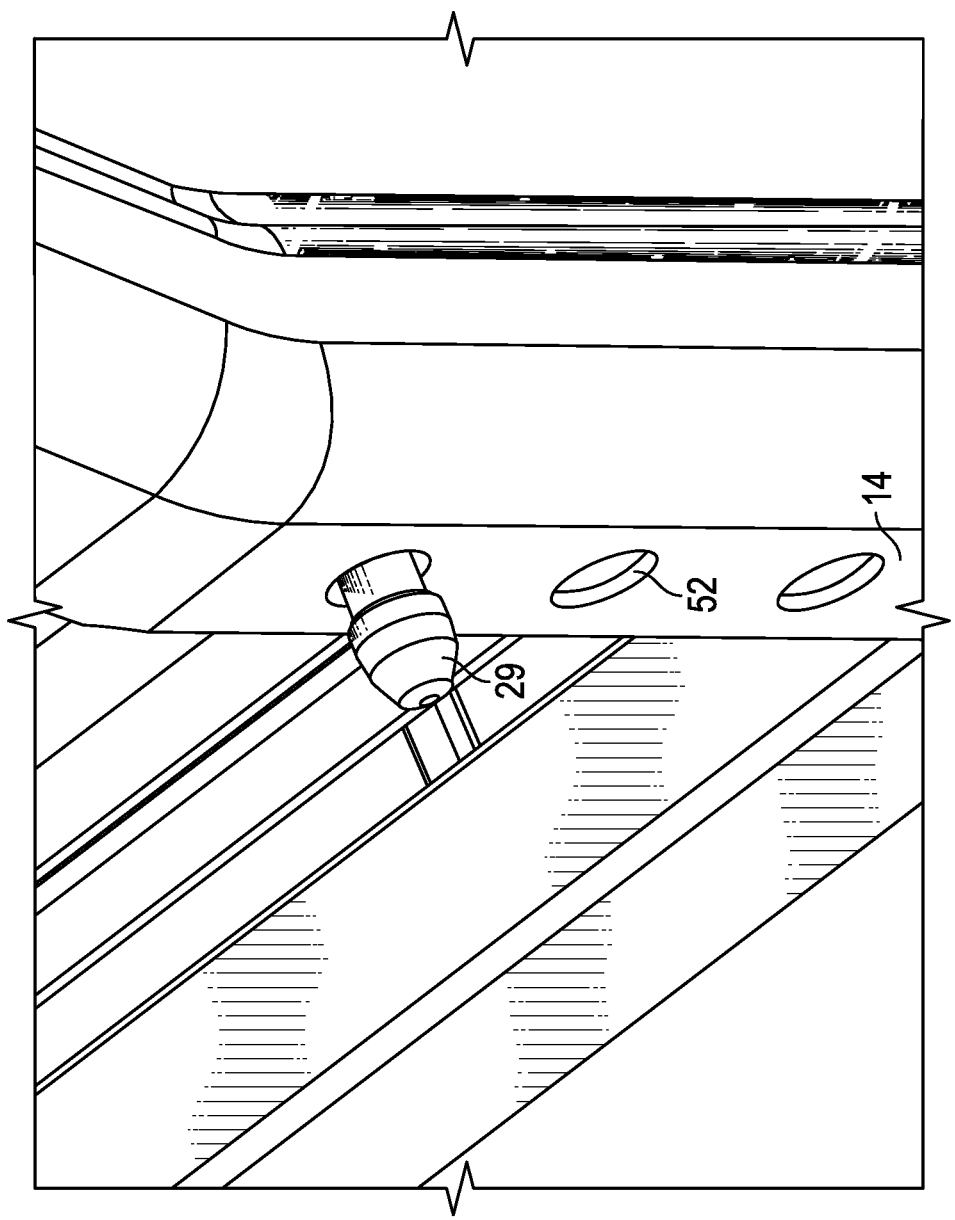
FIG. 5 is a perspective view of a rear portion of the adjustable modular shelving system of FIG. 1.
Figure 6:
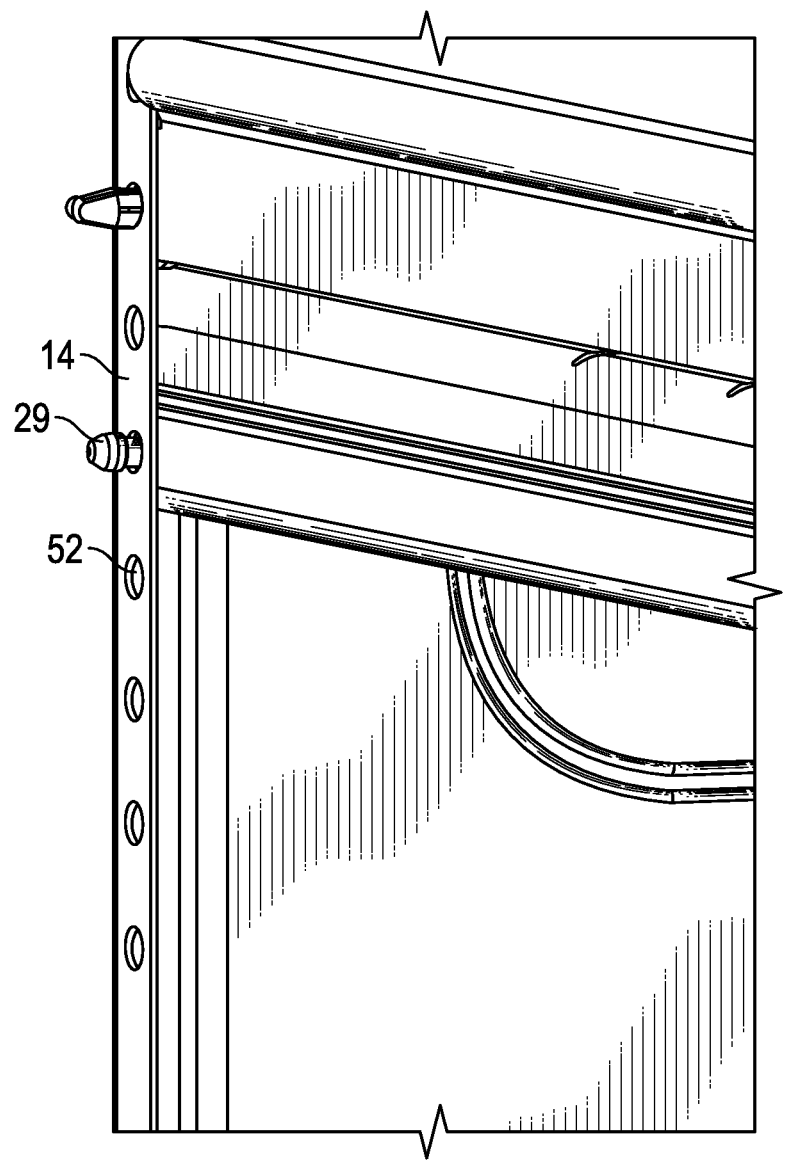
FIG. 6 is another perspective view of a rear portion of the adjustable modular shelving system of FIG. 1.

The shelf unit may also include a locking mechanism including but not limited to a locking locating pin 29 located near an outer peripheral portion of the shelf flanges 24 (see also FIGS. 5 and 6). The locking locating pin 29 may extend in a rearward direction from the shelf flange 24, and may be configured to provide a positive lock with the end panel 12 via the corresponding end panel flange rear aperture 52. The locking locating pin 29 may extend in a rearward direction from the shelf flange 24 and may be configured to provide a positive lock with the end panel 12 via the corresponding end panel flange rear aperture 52. The locking locating pin 29 illustrated in the aforementioned figures may include a conical end which allows for easier insertion into a desired end panel flange rear aperture 52.

Although a single locking locating pin 29 may be located at a location near each respective end portion of the shelf flange 24, it should be appreciated that additional locking locating pins 29 and at differing locations may be included in other examples. Further, another type of securing feature may be employed which provides a locking function between the shelf 20 and the end panel 12. Additionally, although in this example the locking locating pins 29 are integral to the shelving unit 20, it should be appreciated that these features may be made separable from the shelf 20 and securably attached thereto in another example.

The shelf base 22 includes at least aperture 26 and a channel 28. A plurality of shelf base apertures 26 and shelf base channels 28 may be included at predetermined locations as shown in FIG. 2 to accommodate the placement and securement of various accessories and attachments thereto. The base aperture 26 and shelf base channel 28 have a shape which is correspondent with that of a predetermined securing feature.

Although the shelf base aperture 26 and shelf base channel 28 are spaced in this example at equidistant locations, it should be appreciated that the foregoing features may be spaced at a variety of distances from one another in another example. Further, although the shelf base 22 illustrated in FIG. 2 is essentially planar, it should be appreciated that other configurations may be employed to accommodate various products and inventory of differing numbers and sizes.

Figure 3:
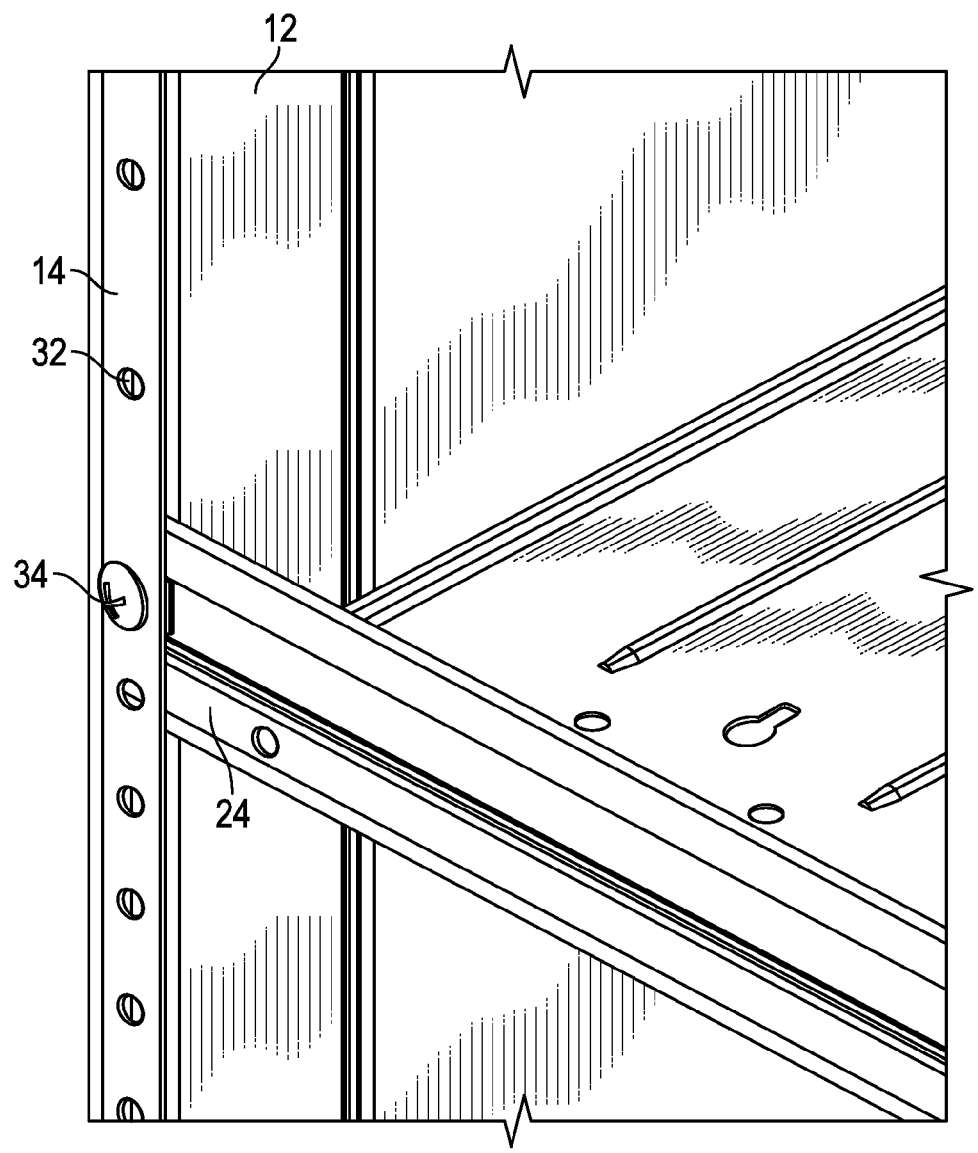
FIG. 3 is a perspective view of a front portion of the adjustable modular shelving system of FIG. 1.

Referring to FIG. 3, a front wall of an end panel flange 14 for an end panel 12 is illustrated. Further, the end panel flange 14 is generally planar and extends longitudinally along an outer edge of the end panel 12. In this example, the end panel flange 14 extends along a peripheral edge of the end panel 12, which includes top, bottom, frontal, and rear portions thereof. In another example, the end panel flange extends along an entirety of a peripheral edge of the end panel 12.

The front wall of the end panel flange 14 includes a plurality of end panel flange front apertures 32. The end panel flange front apertures 32 may be arranged at predetermined locations along an entirety of a front portion of the end panel flange 14. However, it should be appreciated that the end panel flange front apertures 32 may be included along a single predetermined portion, multiple predetermined portions, or randomly along the front portion of the end panel flange 14.

The end panel flange front apertures 32 illustrated in FIG. 3 may receive a securement feature 34 which engages a threaded spring clip (not illustrated) included on an inner surface of the front portion of the end panel flange 14 to thereby securably couple a shelf 20 to the formed end panels 12. The securement feature 34 may include a screw, bolt, or the like. Further, it should be appreciated that the threaded spring clip is non-limiting as other features such as a weld nut, a loose nut, or the like which provide a securement function may be similarly utilized to secure the front portion of the shelf 20 to the end panels 12.

Figure 4:
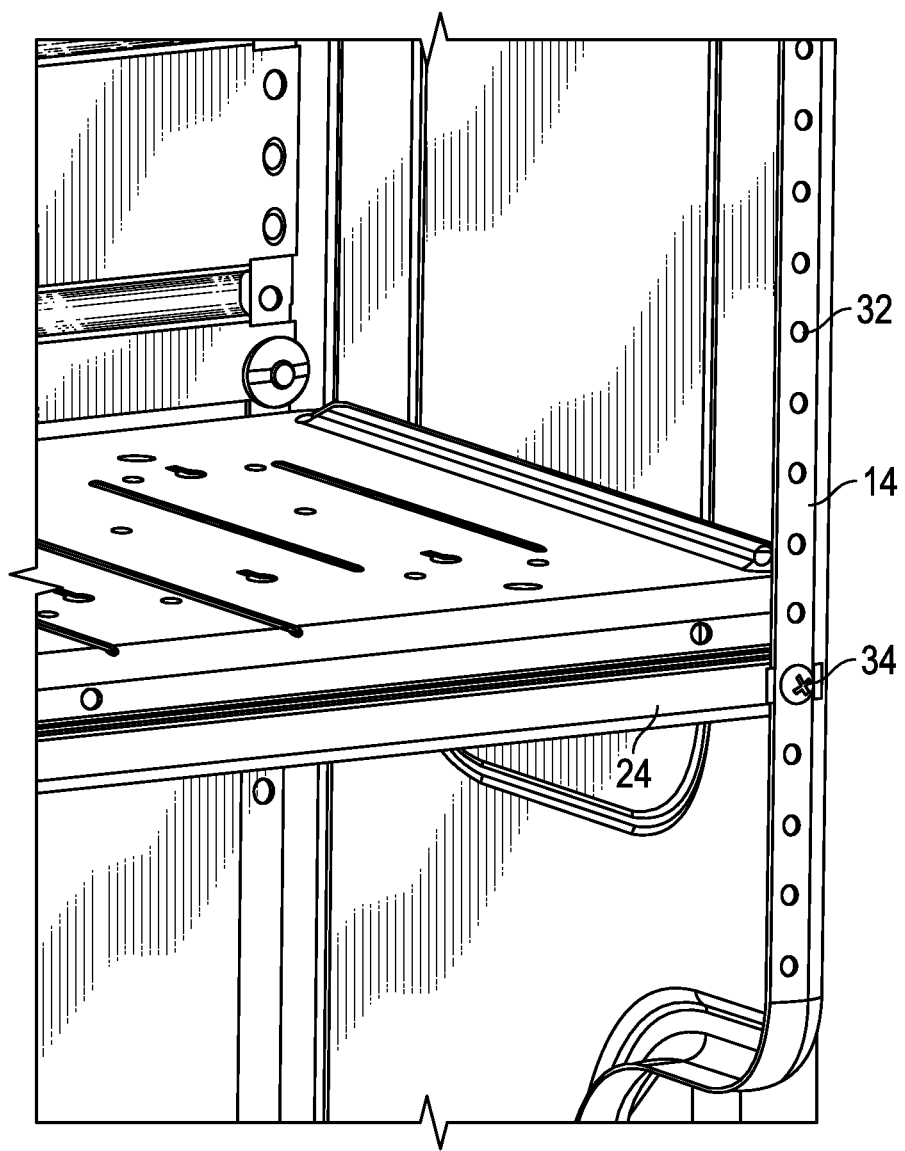
FIG. 4 is another perspective view of a front portion of the adjustable modular shelving system of FIG. 1.

Although the end panel flange 14 in the example of FIG. 3 is integrally formed with the end panel 12, multiple flange pieces may be combined to form the end panel flange of this example. Further, the end panel flange 14 may be made separable from the end panel 12 and secured thereto via a bolt, weld, and the like. In another example, the end panel flange 14 may be made from the same material or different material from that of the end panel 12. In still another example the end panel flange 14 may extend only along a single predetermined portion or multiple predetermined portions of the end panel 12. Another perspective view of the front portion of the end panel flange 14 is provided in FIG. 4.

Referring to FIGS. 5 and 6, a rear wall of the end panel flange 14 of the end panel 12 is illustrated. The rear wall of the end panel flange 14 includes a plurality of end panel flange rear apertures 52 spaced at predetermined locations along an entirety of the rear portion of the end panel flange 14. However, the end panel flange rear apertures 52 may be included along a predetermined portion, multiple predetermined portions, or randomly along the rear portion of the end panel flange 14.

The end panel flange rear apertures 52 may be larger than the end panel flange front apertures 32 in the examples illustrated in the figures to aid in the angular insertion of the locking locating pin 29. Additionally, as a non-limiting example, the end panel flange rear apertures 52 and the end panel flange front apertures 32 are generally located in a correspondent manner along a horizontal plane.

It should be appreciated that although the end panels 12 illustrated in the figures are configured for specific directional attachment with the shelfs 20 (e.g., left side and right side), other configurations of an end panel may be employed which include a single uni-directional end panel or an end panel having flat flanges or bolting surfaces for interfacing with a rail mounting system. Further, the end panels may include embossed/stamped stiffening ribs.

In operation, to secure the shelf 20 between end panels 12, a positive lock is established between the locking locating pins 29 and the end panel flange rear apertures 52 when the shelving unit 20 is inserted between the end panels 12 and pivoted in a predetermined angled direction for insertion within the end panel flange rear apertures 52 until a groove of the locking locating pin 29 drops down and over the end panel flange rear aperture 52. Once an edge of the end panel flange rear aperture 52 is positioned into the groove of the locking locating pin 29, horizontal movement of the shelf 20 is restricted and the shelf 20 is effectively locked into place.

Further securement of the shelf 20 is achieved through the engagement of the securement features 34 included at a front portion of the end panel flange front apertures 32 and the threaded spring clip included on the inner surface of the front portion of the end panel flange 14. The foregoing configuration allows for the securable coupling of the shelf 20 between the end panels 12 and restricts the shelf 20 from further vertical movement.

It should be appreciated that the adjustable modular shelving system 10 becomes rigidified and an integral structure with the vehicle through: 1) the securement of the adjustable modular shelving system 10 with a rail mounting system which includes mounting rails along a cargo area floor and a cargo area sidewall; and 2) the above described securement of the shelf 20 with the end panels 12.

Through the above described structural configuration of the shelf 20, these shelves 20 may be expediently and easily installed (or re-adjusted) by an end user as the end user's requirements of the adjustable modular shelving system 10 changes (e.g., the addition or removal of additional shelves 20, the addition or removal of another accessory part, etc.) to more appropriately accommodate variously sized products and inventory. This is because the secured attachments of the shelves are readily removable.

Figure 7:
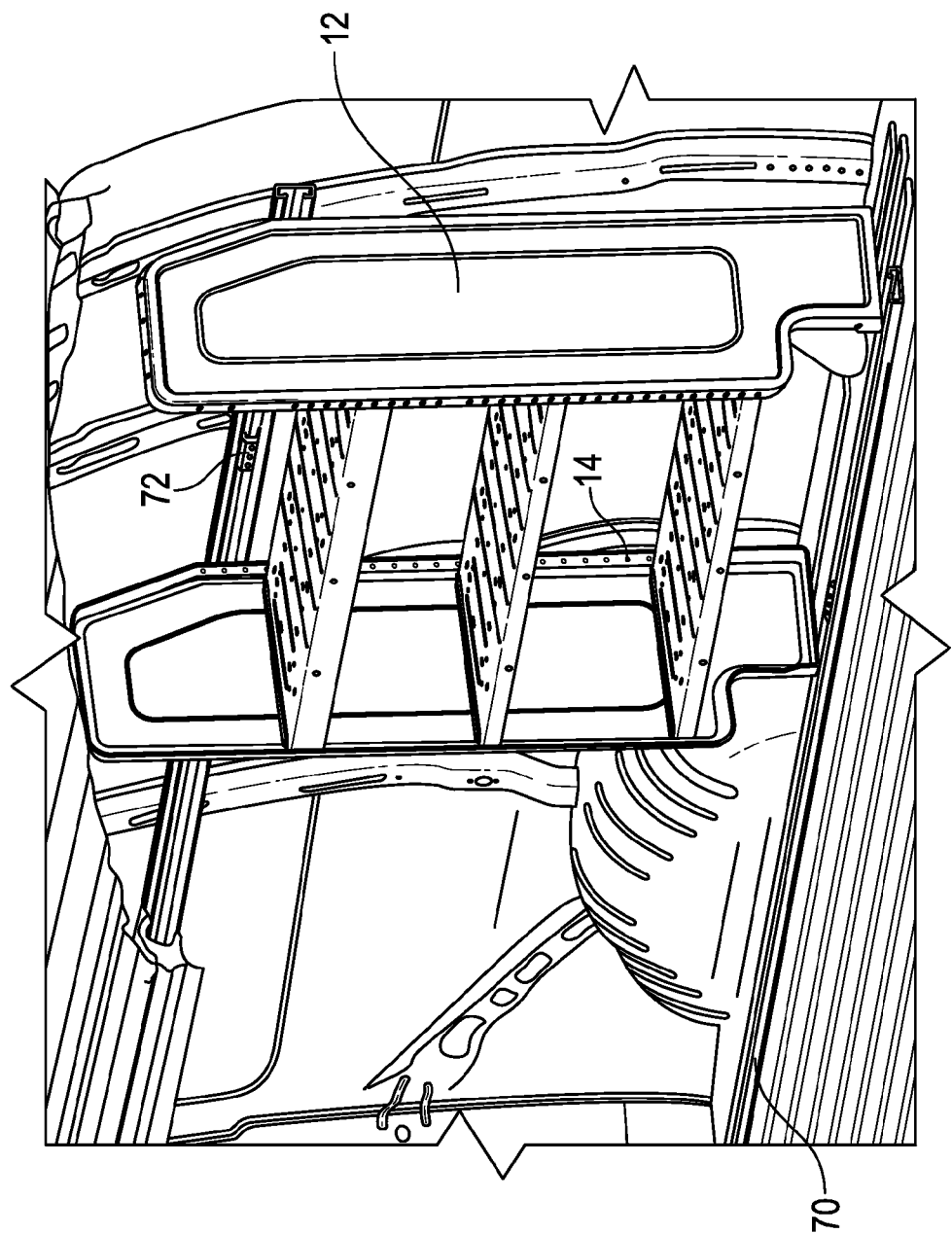
FIG. 7 is another perspective view of the adjustable modular shelving system of FIG. 1.
Figure 8:
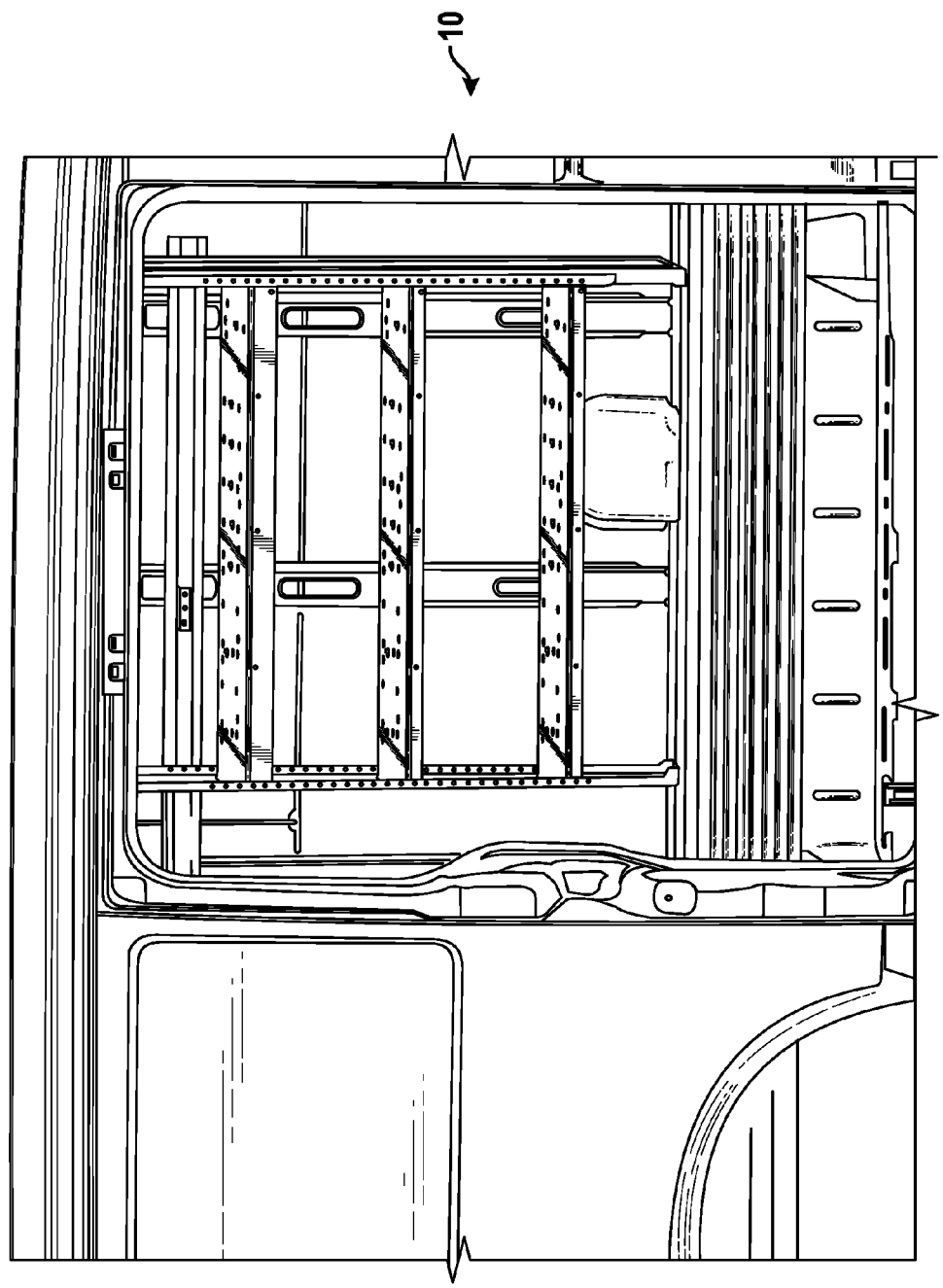
FIG. 8 is yet another perspective view of the adjustable modular shelving system of FIG. 1.

The adjustable modular shelving system 10 securably couples to a rail mounting system as illustrated in FIG. 7. In this example, the rail mounting system includes a mounting rail 70 and a slide profile 72 received therein. The end panels 12 securably couple with the mounting rails 70 through the slide profiles 72 which are included at each location in which a portion of an end panel interfaces with the mounting rail 70. Another perspective view of the adjustable modular shelving system installed within the cargo area of a vehicle is illustrated in FIG. 8.

Figure 9:
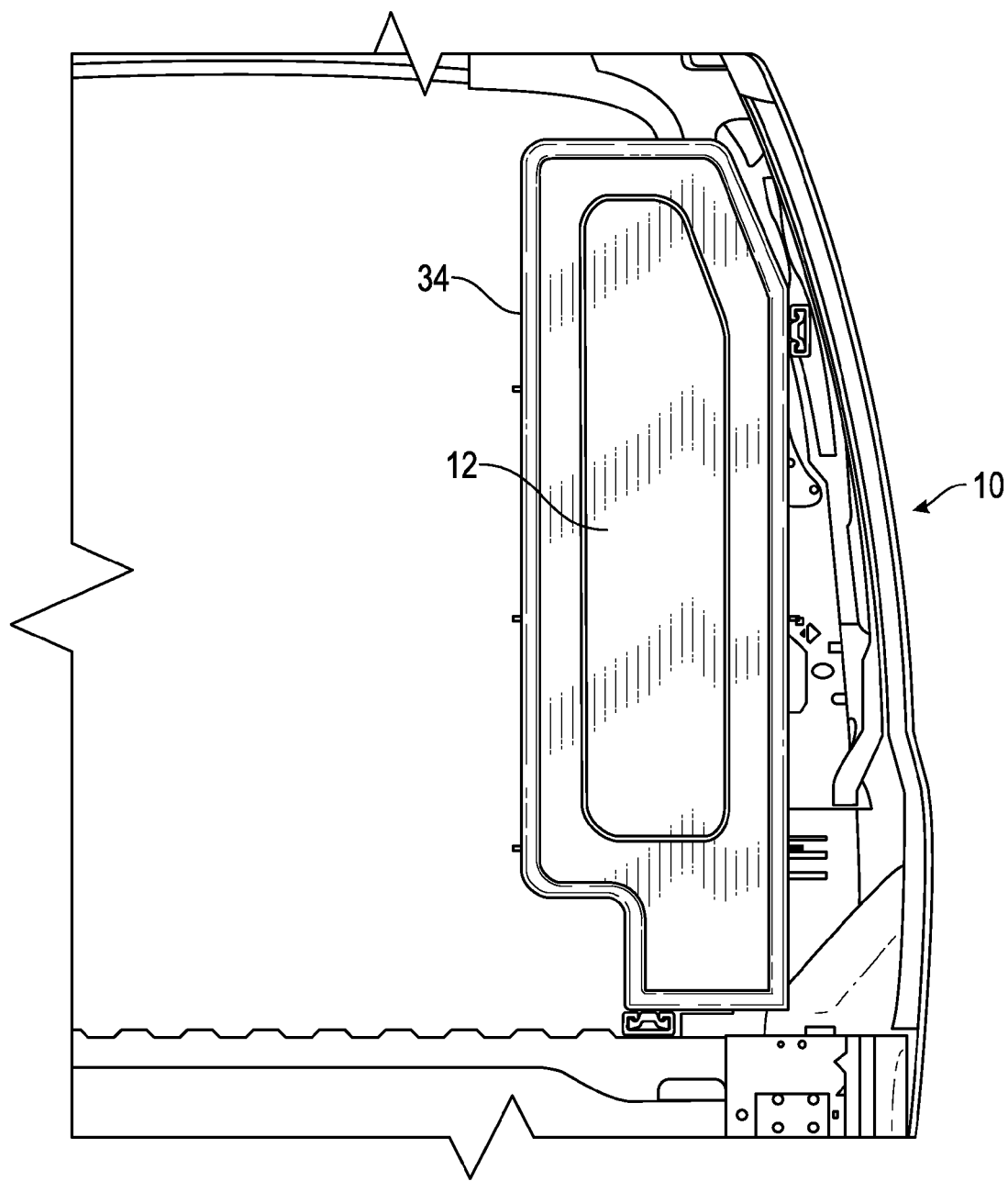
FIG. 9 is a side view of the adjustable modular shelving system of FIG. 1 secured to cargo area surfaces of a vehicle.

In the example of FIG. 9, a side view of an adjustable modular shelving system 10 is illustrated in which a plurality of securement features 34 (e.g., screws), each of which secure a respective shelf 20 to the end panels 12, are illustrated as protruding from a front portion of the end panel flange 14.

Figure 10:
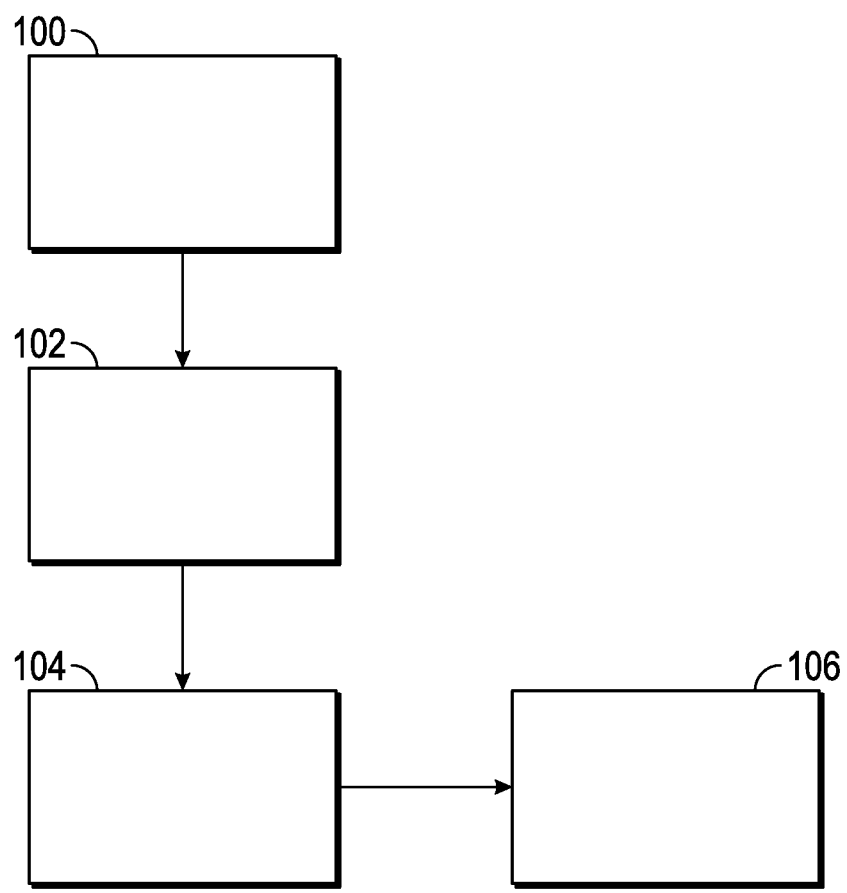
FIG. 10 is a block diagram of the installation of the adjustable modular shelving system of FIG. 1.

In the example of FIG. 10, a method for installing an adjustable modular shelving system 10 is described.

The methodology begins at step 100 with the step of securing a plurality of mounting rails 70 to a cargo area surface of a vehicle and receiving one or more slide profiles 72 within the mounting rail 70. The methodology advances to step 102 with the step of inserting a shelf 20 between the end panels 12 and pivoting in a predetermined angled direction for insertion within the end panel flange rear apertures 52 until a groove of the locking locating pin 29 drops down and over the end panel flange rear aperture 52. Once an edge of the end panel flange rear aperture 52 is positioned into the groove of the locking locating pin 29, horizontal movement of the shelving unit 20 is restricted, and the shelf 20 is effectively locked into place.

Next, the methodology advances to step 104 with the step of securably engaging the shelf flange 24 to a front portion of the end panel flange front aperture 32 and the threaded spring slip included on the inner surface of the front portion of the end panel flange 14 with a securement feature 34.

The methodology advances to step 106 with the step of securing the adjustable modular shelving system 10 to the mounting rails 70 via a securable coupling of the end panels 12 and the slide profiles 72.

The present disclosure has been described in an illustrative manner. It is to be understood that the terminology which has been used is intended to be in the nature of words of description rather than of limitation. Many modifications and variations of the present example are possible in light of the above teachings. Therefore, within the scope of the appended claims, the present disclosure may be practices other than as specifically described.

The invention claimed is:

1. An adjustable modular shelving system secureable to a rail mounting system, comprising:
    a pair of end panels, each of the pair of end panels including an end panel flange having a plurality of end panel flange apertures and extending along a portion of an outer periphery of said each of the pair of end panels; and
    a shelf including a base and a pair of flanges extending from opposing longitudinal edges along the base, one of the pair of shelf flanges having a plurality of locking mechanisms and another one of the pair of shelf flanges including a plurality of shelf apertures, wherein the locking mechanisms are securably connectable with a first side of the pair of end panels and the plurality of shelf apertures are securably connectable with a second side of the pair of end panels.

2. The shelving system of claim 1, wherein the end panels have end panel flanges along their peripheral edges that are securable to a rail mounting system.

3. The shelving system of claim 1, comprising a plurality of shelves.

4. The shelving system of claim 1, wherein the locking mechanisms comprise locking locating pins.

5. The shelving system of claim 1 wherein the base includes at least one aperture.

6. The shelving system of claim 1 wherein the base includes at least one channel.

7. A vehicle with the shelving system of claim 1 mounted thereto.

8. The vehicle of claim 7, wherein the vehicle is a commercial vehicle that further comprises a surface in a cargo area to which the shelving system is mounted.

9. A shelving system secureable to a rail, the shelving system comprising:
    a pair of end panels, each of the pair of end panels including an end panel flange having a plurality of end panel flange apertures and extending along a portion of an outer periphery of said each of the pair of end panels; and
    a plurality of shelves, each including a base and a pair of flanges extending from opposing longitudinal edges along the base, one of the pair of shelf flanges having a plurality of locking locating pins and another one of the pair of shelf flanges including a plurality of shelf apertures, wherein the locking locating pins are securably connectable with a first side of the pair of end panels and the plurality of shelf apertures are securably connectable with a second side of the pair of end panels;
    wherein the shelving system is adjustable through addition or subtraction or moving of shelves via removable securement.

10. A shelving system, comprising:
- at least two end panels, each end panel being a generally planar member having an inner surface, an outer surface and a peripheral edge; and
- at least one shelf that includes at least two locking mechanisms, at least one of the at least two locking mechanisms providing a positive lock with one of the at least two end panels, and at least one other of the at least two locking mechanisms providing a positive lock with at least one other of the at least two end panels, wherein the locking mechanisms comprise locking locating pins that are integral to the shelf.

* * * * *